United States Patent
Zeng (10) Patent No.: US 6,405,298 B1
(45) Date of Patent: Jun. 11, 2002

(54) LINEAR ADDRESS GENERATOR AND METHOD FOR GENERATING A LINEAR ADDRESS USING PARALLEL COMPUTATIONS AND A SINGLE CYCLE ALGORITHM

(75) Inventor: Richard B Zeng, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/510,127

(22) Filed: Feb. 21, 2000

(51) Int. Cl.[7] .............................. G06F 12/00; G06F 9/34
(52) U.S. Cl. ........................ 711/219; 711/220; 711/211; 711/212; 708/708; 708/709
(58) Field of Search .................................. 711/219, 220, 711/211, 212; 708/706, 708, 709, 710

(56) References Cited

U.S. PATENT DOCUMENTS

| | | | | |
|---|---|---|---|---|
| 5,583,806 A | * | 12/1996 | Widigen | 708/708 |
| 5,612,911 A | * | 3/1997 | Timko | 708/670 |
| 5,625,582 A | * | 4/1997 | Timko | 708/708 |
| 5,787,492 A | * | 7/1998 | Shuma et al. | 711/201 |
| 5,790,443 A | * | 8/1998 | Shen et al. | 711/200 |
| 5,961,580 A | * | 10/1999 | Mahalingaiah | 711/220 |

FOREIGN PATENT DOCUMENTS

EP 0724212 * 7/1996

* cited by examiner

Primary Examiner—Glenn Gossage (57) ABSTRACT

A high-speed linear address generator (LAGEN) and method for generating a linear address are disclosed, which generator is operable to generate a linear address very quickly. In a preferred embodiment, the LAGEN has a parallel design, rather than a serial design, which allows the LAGEN to generate a linear address substantially faster than 1 nanosecond after receiving input operands. The LAGEN generates a linear address within a single clock cycle of a clock operating at 1 gigahertz (GHz). The LAGEN receives three 32-bit operands IMM[31:0], SRC1[31:0], and SRC2[31:0], and compresses them into two 32-bit operands. The LAGEN then sums the two operands producing a 32-bit result res[32:0]. The LAGEN allows for both 32-bit mode operation and 16-bit mode operation. In either mode of operation the lower 16 bits of the result, res[15:0], are output for the lower 16 bits of the generated linear address. The LAGEN comprises multiplexors arranged to select the output for the higher 16 bits of the linear address based upon the mode of operation for the LAGEN. Accordingly, the possible outputs for the higher 16 bits of the linear address are generated in parallel and then the appropriate one is selected for output based on the LAGEN's mode of operation.

19 Claims, 3 Drawing Sheets

LINEAR ADDRESS GENERATOR AND METHOD FOR GENERATING A LINEAR ADDRESS USING PARALLEL COMPUTATIONS AND A SINGLE CYCLE ALGORITHM

TECHNICAL FIELD

This invention relates in general to circuitry within a processor for generating a linear address, and in specific to a parallel design of a linear address generator (LAGEN) that is capable of high-speed linear address generation.

BACKGROUND

Figure 1:
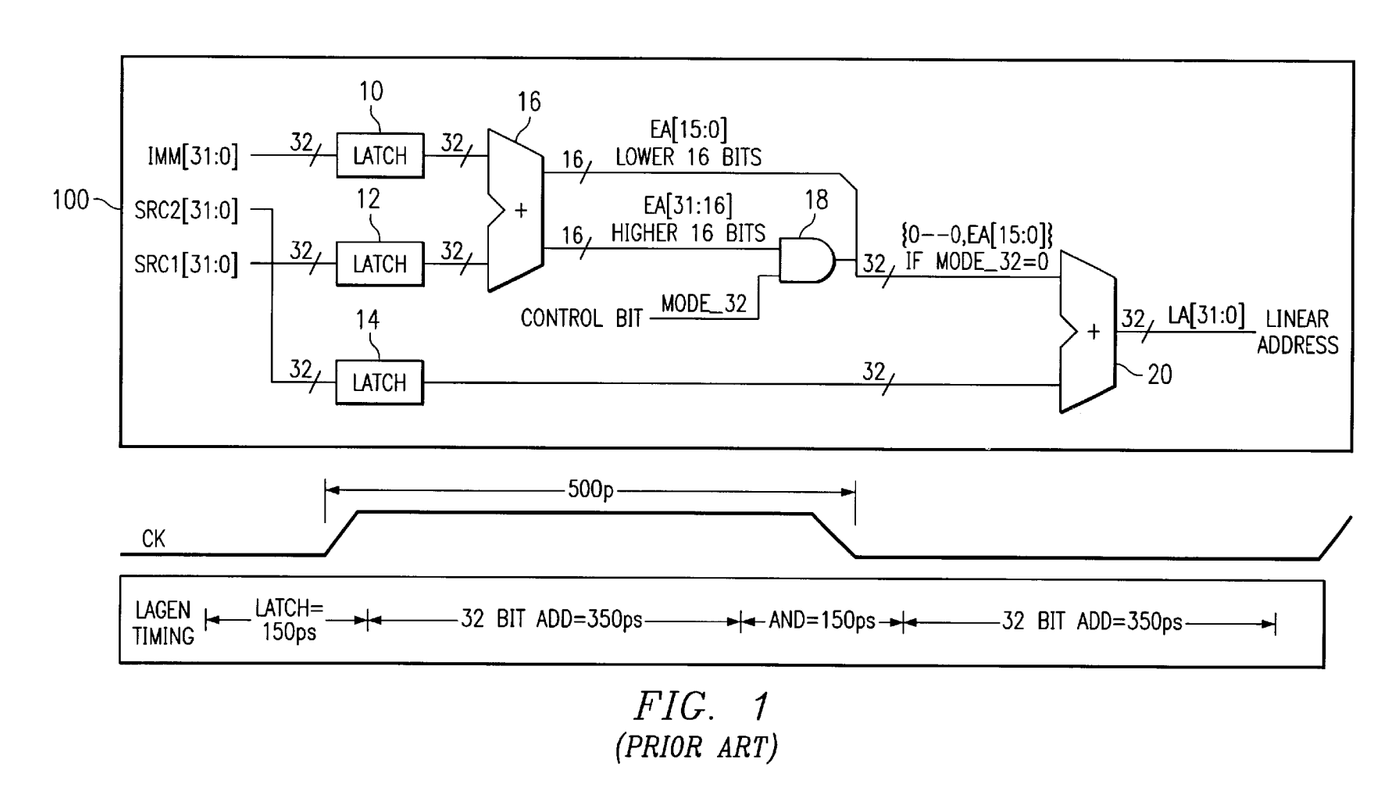
FIG. 1 shows an exemplary prior art LAGEN implementation that utilizes two 32-bit adders in series to generate a linear address.

A linear address generator ("LAGEN") is typically implemented in processors of the prior art, such as the Merced processor developed by Intel Corporation in partnership with Hewlett Packard. An exemplary function of a LAGEN is to generate a memory address for data memory load in a processor to enable support for both IA-64 mode and x86 mode of operation, which are well-known modes of operation in the prior art. Prior art LAGENs typically require at least two clock cycles to complete (i.e., to generate a resulting linear address). An example of a typical LAGEN implementation of the prior art is illustrated in FIG. 1. As shown in FIG. 1, LAGEN circuitry 100 is implemented within a processor, and such LAGEN circuitry 100 typically allows for both 32-bit mode operation and 16-bit mode operation. 32-bit mode operation utilizes a 32-bit memory address, while 16-bit mode operation utilizes a 16-bit memory address. For instance, 16-bit mode operation is commonly utilized to perform x86 instructions that are 16 bits. LAGEN circuitry 100 includes LATCHES 10, 12, and 14, which latch operands IMM[31:0], SRC1[31:0], and SRC2[31:0], respectively. In FIG. 1, IMM[31:0] (i.e., "immediate address"), SRC1[31:0] (i.e., "source 1"), and SRC2[31:0] (i.e., "source 2") represent input operands used to compute the memory address. LAGEN circuitry 100 further includes an adder, such as the 32-bit adder 16, to add the first two operands, SRC1[31:0] and IMM[31:0] of FIG. 1. Adder 16 produces a result having the higher 16 bits, shown as effective address (EA) EA[31:16], and the lower 16 bits, shown as EA[15:0], separated.

Thereafter, the higher 16 bits (i.e., bits EA[31:16]) are ANDed with a mode_32 control bit in the AND gate 18 to obtain an intermediate result. When the mode_32 control bit is set to 1 (high), the higher 16 bits EA[31:16] are passed as the output of AND gate 18. That is, when 32-bit mode operation is enabled, the circuitry passes the higher 16 bits EA[31:16] through AND gate 18 where they are combined with the lower 16 bits EA[15:0] resulting in an intermediate result of {EA[31:16], EA[15:0]}. On the other hand, when 32-bit mode operation is disabled (meaning 16-bit mode is enabled), the mode_32 control bit is set to 0. Accordingly, the output of AND gate 18 will be zero for each of the higher 16 bits. That is, AND gate 18 zeroes out all of the higher 16 bits and leaves the lower 16 bits EA[15:0] undisturbed, resulting in an intermediate result of $\{0_{31}, 0_{30}, 0_{29}, \ldots 0_{16}, EA[15:0]\}$. It should be recognized that regardless of whether 32-bit mode or 16-bit mode is enabled, the lower 16 bits resulting from adder 16, i.e., EA[15:0], are utilized for the intermediate result.

This intermediate result is then added with the operand SRC2[31:0], which has been latched in latch 14. As shown in FIG. 1, adder 20 is used to add the intermediate result and SRC2[31:0] to generate a final result, i.e., the final linear address LA[31:0]. Thus, the prior art typically utilizes a 2-series, 32-bit addition implementation as described above in conjunction with FIG. 1. That is, the prior art typically requires first adding the SRC1[31:0] and IMM[31:0] operands to obtain an intermediate result, and then the intermediate result is modified with AND gates for either 32-bit mode or 16-bit mode operation. Thereafter, a second addition is performed, in which the intermediate result is added to the SRC2[31:0] operand to generate the linear address.

Prior art LAGEN implementations are problematic because they require a relatively lengthy time to generate the final linear address LA[31:0]. For example, as shown in FIG. 1, such an implementation may require well over 800 picoseconds to obtain the final linear address LA[31:0]. For instance, in the exemplary prior art implementation illustrated in FIG. 1, latching the operands into latches 10, 12, and 14 requires approximately 150 picoseconds, executing adder 16 requires approximately 350 picoseconds, executing AND gate 18 requires approximately 150 picoseconds, and executing adder 20 requires approximately 350 picoseconds. Therefore, such prior art implementation requires a total time of approximately 1000 picoseconds (or 1 nanosecond) to generate a linear address LA[31:0]. With increasing clock speeds (i.e., processor speeds), it becomes impossible to generate a linear address in a timely manner utilizing a prior art implementation. For example, it becomes impossible to generate a linear address within a single clock cycle utilizing prior art LAGEN implementations. For instance, when operating at a 1 gigahertz (Ghz) clock speed (i.e., $10^9$ cycles per second), the LAGEN must be capable of generating a linear address within 1000 picoseconds (1 nanosecond) in order to complete within a single clock cycle. Because network bypassing, as well as other tasks that are typically required, the LAGEN circuitry may be required to complete substantially faster than 1 nanosecond to generate a linear address within 1 clock cycle of a 1 GHz clock. An example of one task that may need to be performed, thereby requiring the LAGEN to complete very fast, is a check on the memory address limit to determine if the linear address is valid. Prior art LAGEN implementations are unable to achieve a result in such a timely manner.

It is very desirable to provide a single-cycle LAGEN to enable a much simpler design in the first level cache (i.e., L0 cache), as well as a much simpler design for a 16-bit mode translator recorder IVE, which may be implemented within a processor. Generally, IVE is a major block of circuitry that enables 16-bit mode and 8-bit mode x86 instructions to be executed within IA-64 architecture processors, such as the Merced CPU from Hewlett-Packard Company. Prior art processors, such as Merced, typically include a two-cycle LAGEN and an out-of-order IVE. Generally, an out-of-order IVE is much more complex in design, consumes a larger amount of surface area (e.g., silicon), has increased routing congestion, and requires more effort to verify functional correctness and electrical reliability, than for an in-order IVE. Accordingly, it is desirable to have a single-cycle LAGEN to enable an in-order IVE for a processor. Furthermore, a single-cycle LAGEN would generally allow for faster accesses to the first-level cache. In general, a LAGEN generates linear addresses for all on-chip cache access, e.g., access to level 1 ("L0"), level 2 ("L1"), etc.). A single-cycle LAGEN would not only enable faster cache access, but would also facilitate a simpler cache structure. With a single-cycle LAGEN, an in-order IVE may be implemented, which is generally less complex and much smaller than an out-of-order IVE, which is typically required for prior art, two-cycle LAGENs.

SUMMARY OF THE INVENTION

In view of the above, a desire exists for a high-speed LAGEN for generating a linear address within a processor in a timely manner. A further desire exists for a high-speed LAGEN that is capable of generating a linear address in substantially less than 1 nanosecond. For instance, a desire exists for a high-speed LAGEN that is capable of generating a linear address in less than 0.5 nanosecond. Yet a further desire exists for a high-speed LAGEN that includes linear address generation and a bypass network, and is capable of generating a linear address within a single clock cycle of a clock operating at 1 GHz.

These and other objects, features and technical advantages are achieved by a high-speed LAGEN. That is, a high-speed LAGEN is disclosed, which generates a linear address very quickly. In a preferred embodiment, the high-speed LAGEN has a parallel design, as opposed to the serial design of prior art LAGENs. Such a parallel design allows for a much faster generation of a linear address. In a most preferred embodiment, the LAGEN generates a linear address within a single clock cycle when the clock is operating at 1 GHz. Accordingly, in a most preferred embodiment, the LAGEN is a single-cycle LAGEN capable of generating a linear address within a single clock cycle for high-speed processors (e.g., processors operating at 1 GHz). Although, it should be recognized that in alternative embodiments the LAGEN may be implemented in processors having such fast clock speeds that the LAGEN cannot generate a linear address within a single clock cycle (but may still produce a linear address very quickly), and any such embodiment is intended to be encompassed by the present invention.

In a preferred embodiment, the single-cycle LAGEN first compresses three operands (i.e., IMM[31:0], SRC1[31:0], and SRC2[31:0]) into two operands, and the two operands are then added by a 32-bit adder to generate a linear address (i.e., LA[31:0]). In a preferred embodiment, a Carry-Save-Adder (CSA) array is implemented to compress the three operands into two operands, which are then latched. That is, the three operands are fed to a CSA array, which generates two operands (i.e., a sum and a carry). Thereafter, a preferred embodiment utilizes a 32-bit adder to sum the two operands (i.e., the sum and carry) to generate a result, i.e., res[31:0]. It should be understood that the lower 16 bits of such result may be indicated as res[15:0] and the higher 16 bits of such result may be indicated as res[31:16].

In a preferred embodiment, the LAGEN allows for both 32-bit mode operation and 16-bit mode operation. In either mode of operation the lower 16 bits of the result, res[15:0], (generated by adding the sum and carry as described above) are utilized for the lower 16 bits of the generated linear address, i.e., for LA[15:0]. A preferred embodiment is configured to utilize the higher 16 bits of the result, res[31:16], for the higher 16 bits of the generated linear address, i.e., for LA[31:16], when 32-bit mode operation is enabled.

On the other hand, when 32-bit mode operation is not enabled (meaning that 16-bit mode operation is enabled) a preferred embodiment does not utilize the higher 16 bits of the result, res[31:16], for the higher 16 bits of the generated linear address, LA[31:16]. Rather, a preferred embodiment utilizes the higher 16 bits of the SRC2 operand for the higher 16 bits of the generated linear address, LA[31:16]. More specifically, a preferred embodiment determines whether a carry out bit was carried from bit 15 to bit 16 of the SRC2 operand when the EA[15:0] (i.e., the sum of IMM[15:0] and SRC1[15:0]), and SRC2[15:0] operands are added. That is, a preferred embodiment determines whether a carry out bit is generated when adding the EA[15:0] and SRC2[15:0] operands. In a preferred embodiment, such determination of a carry out is made in parallel with the operation of the above-described adder generating the result res[31:0], such that the determination is made in a timely manner. If such a carry out bit is not generated, then the higher 16 bits of operand SRC2, SRC2[31:16], are utilized for the higher 16 bits of the generated linear address, LA[31:16], for 16-bit mode operation. If, however, such a carry out bit is generated, then the higher 16 bits of operand SRC2, SRC2[31:16], incremented by 1 (i.e., incremented by the carry out bit) are utilized for the higher 16 bits of the generated linear address, LA[31:16], for 16-bit mode operation. In a preferred embodiment, the higher 16 bits of operand SRC2, SRC2[31:16], may be incremented by 1 in parallel with the operation of the above-described adder generating the result res[31:0], such that SRC2[31:16] incremented by 1 is available for use as the 16 higher bits of the generated linear address, LA[31:16], if necessary, in a timely manner.

Accordingly, in a preferred embodiment, a parallel design is utilized for a LAGEN, which results in a high-speed LAGEN, as opposed to the slower, serial design LAGENs implemented in the prior art. For instance, in a most preferred embodiment, the LAGEN is capable of generating a linear address within a single clock cycle for a clock speed of 1 GHz. It should be appreciated that a technical advantage of one aspect of the present invention is that a high-speed LAGEN is provided that is capable of generating a linear address within a processor in a timely manner. It should be further appreciated that a technical advantage of one aspect of the present invention is that a high-speed LAGEN is provided that is capable of generating a linear address in substantially less than 1 nanosecond. Furthermore, in a most preferred embodiment, a high-speed LAGEN is provided that is capable of generating a linear address in less than 0.5 nanosecond. It should also be appreciated that a technical advantage of one aspect of the present invention is that a high-speed LAGEN is provided that is capable of generating a linear address within 1 clock cycle of a 1 GHz clock. Still a further advantage of one aspect of the present invention is that the high-speed LAGEN allows for fast access to cache and a simple design of cache and enables an in-order IVE implementation within the processor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawings, in which.

DETAILED DESCRIPTION

Figure 2A:
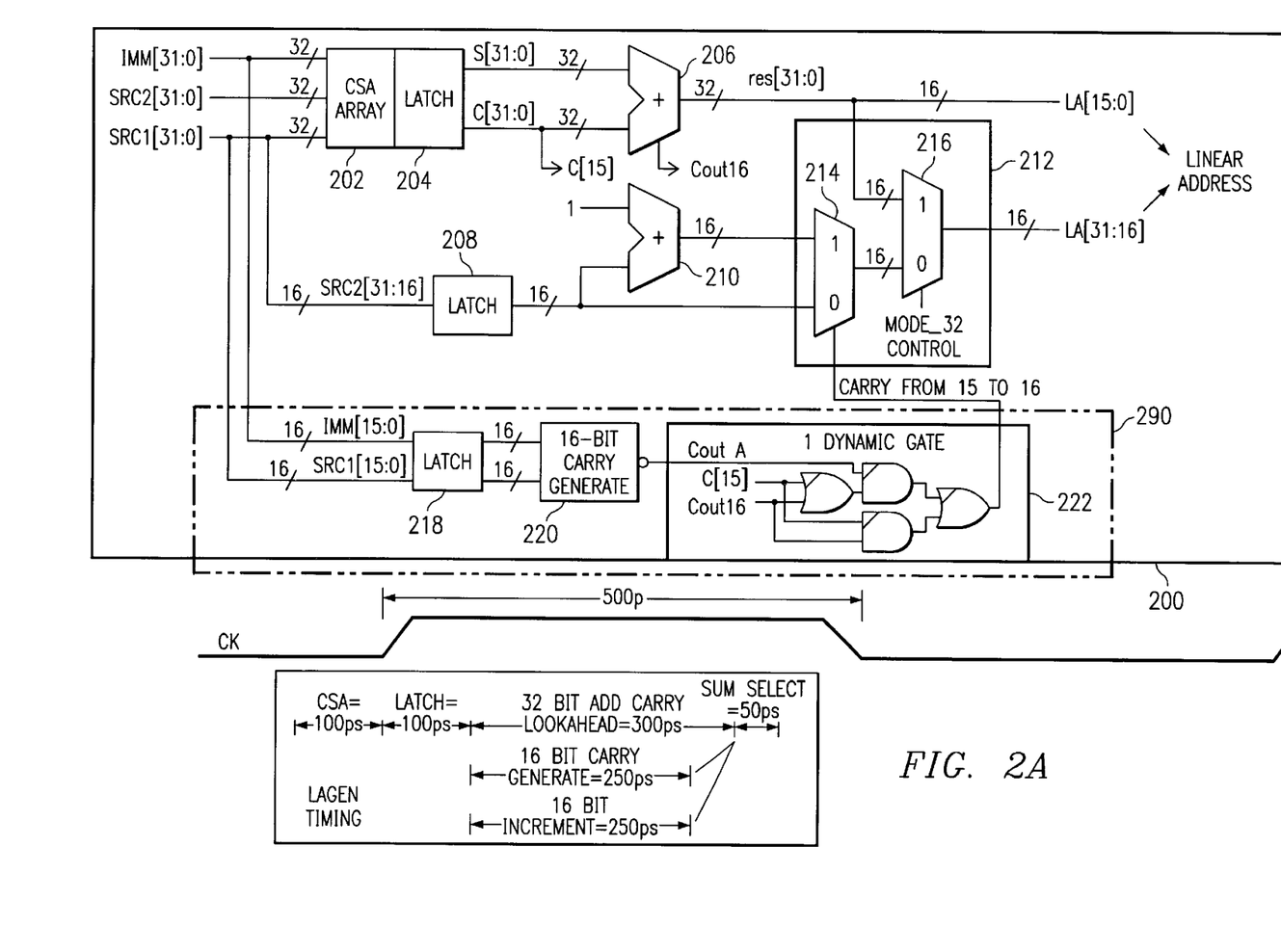
FIG. 2A shows a preferred embodiment for LAGEN circuitry that generates a linear address in a timely manner.

Turning to FIG. 2A, a preferred embodiment of the present invention is shown. As shown in FIG. 2A, LAGEN circuitry 200 comprises a CSA array 202 to compress the three operands IMM[31:0], SRC1[31:0], and SRC2[31:0] to two operands, which are the sum S[31:0] and carry C[31:0] of the CSA array 202. The sum S[31:0] and carry C[31:0] of CSA array 202 are then latched in latch 204 and input to a 32-bit adder 206. The 32-bit adder 206 adds the sum S[31:0] and carry C[31:0] generated by CSA array 202 to generate the final sum (shown as res[31:0]) of the three operands IMM[31:0], SRC1[31:0], and SRC2[31:0].

As shown in FIG. 2A, the final sum produced by the 32-bit adder 206 is a 32-bit result (i.e., res[31:0]). In a preferred embodiment, the LAGEN circuitry 200 is implemented to operate in either 32-bit or 16-bit mode. Thus, LAGEN circuitry 200 splits the 32-bit result into its lower 16 bits (i.e., res[15:0]) and its higher 16 bits (i.e., res[31:16]). It will be understood that the lower 16 bits (i.e., res[15:0]) are utilized for the lower 16 bits of the linear address generated by LAGEN circuitry 200 (i.e., LA[15:0]) regardless of whether the LAGEN is operating in the 32-bit mode or the 16-bit mode.

In a preferred embodiment, a multiplexer ("MUX") 216 is utilized to select whether the higher 16 bits (i.e., res[31:16]) are included in the final result of LAGEN circuitry 200, depending on whether the LAGEN is operating in 32-bit mode or 16-bit mode. If operating in 32-bit mode, a mode_32 control bit, which controls MUX 216, is set high (i.e., set to 1), thereby causing MUX 216 to pass the higher 16 bits (i.e., res[31:16]) to the higher 16 bits of the generated linear address (i.e., LA[31:16]. If not operating in 32-bit mode (and thereby operating in 16-bit mode), the mode_32 control bit is set low (i.e., set to 0), thereby causing MUX 216 to pass the output of MUX 214 for the higher 16 bits of the generated linear address (i.e., LA[31:16]).

Figure 2B:
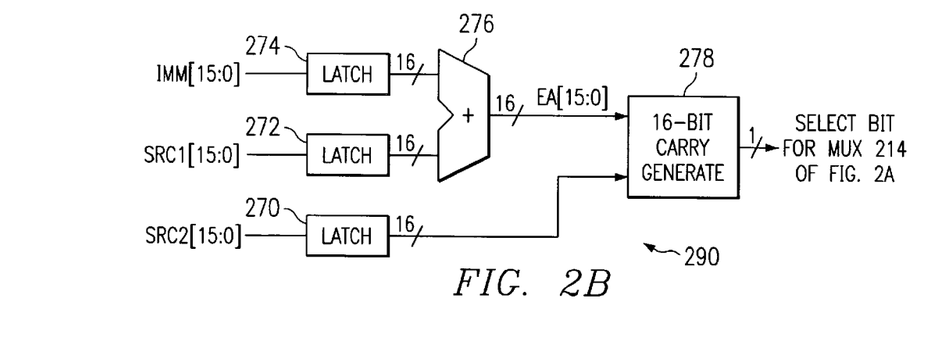
FIG. 2B shows exemplary circuitry for generating the select signal for MUX 214 of FIG. 2A.

As shown in FIG. 2A, MUX 214 selects between two inputs based on whether a carry out bit is generated from bit 15 to bit 16 of operand SRC2 when EA[15:0] and SRC2[15:0] are added together (see FIG. 2B). The first input to MUX 214 is SRC2[31:16]. This first input is selected to be output by MUX 214 when there is not a carry out from bit 15 to bit 16 of the SRC2 operand. That is, when the carry from bit 15 to bit 16 of the SRC2 operand is 0, the MUX 214 passes SRC2[31:16] as its output, which is input to MUX 216. More specifically, as shown in FIG. 2A, SRC2[31:16] is latched in latch 208 and input to MUX 214. In a most preferred embodiment, SRC2[31:16] is latched in latch 208 substantially in parallel with the sum S[31:0] and carry C[31:0] from CSA array 202 being latched in latch 204.

The second input to MUX 214 is SRC2[31:16] incremented by 1. As shown in FIG. 2A, SRC2[31:16] incremented by 1 is produced in a preferred embodiment by feeding SRC2[31:16] from latch 208 to incrementer or adder 210. The output of adder 210 is SRC2[31:16] incremented by 1, which is input to MUX 214. In a most preferred embodiment, LAGEN circuitry 200 is arranged such that incrementer 210 increments SRC2[31:16] substantially in parallel with the execution of adder 206, thereby producing SRC2[31:16] incremented by 1 in a timely manner. That is, in a most preferred embodiment, SRC2[31:16] incremented by 1 may be readily available such that it may be utilized as the higher 16 bits of the generated linear address if appropriate, i.e., if MUX 214 determines that there is a carry out bit generated from bit 15 to bit 16 of SRC2 when SRC2[15:0] and EA[15:0] are added and if MUX 216 determines that 16-bit mode operation is enabled (the mode_32 control bit is low). Accordingly, in a most preferred embodiment, SRC2[31:16] incremented by 1 is readily available to be utilized for the higher 16 bits of the generated linear address at the time that it is determined whether it is to be utilized for the higher 16 bits of the generated linear address, rather than requiring additional time to compute SRC2[31:16] incremented by 1 after it has been determined that it is to be used for the higher 16 bits of the generated linear address. SRC2[31:16] incremented by 1 is input to MUX 214 and is selected to be output by MUX 214 when there is a carry out from bit 15 to bit 16 of the SRC2 operand. That is, when the addition of EA[15:0] and SRC2[15:0] generates a carry out from bit 15 to bit 16 of the SRC2 operand (see FIG. 2B), MUX 214 passes SRC2[31:16] incremented by 1 as its output, which is input to MUX 216.

As discussed above, MUX 214 selects one of its inputs depending on whether the addition of EA[15:0] and SRC2[15:0] generates a carry out bit. Thus, in a most preferred embodiment, LAGEN circuitry 200 includes circuitry 290 for determining whether such a carry out bit is produced. As shown in FIG. 2A, in a preferred embodiment, circuitry 200 includes a latch 218 that latches IMM[15:0] and SRC1[15:0]. In a most preferred embodiment, IMM[15:0] and SRC1[15:0] are latched in latch 218 substantially in parallel with the sum S[31:0] and carry C[31:0] from CSA array 202 being latched in latch 204. After being latched in latch 218, IMM[15:0] and SRC1[15:0] are fed to 16-bit carry generator 220, which operates in conjunction with dynamic circuit 222 to determine, in a manner that is well-known in the art, whether a carry out bit is produced by the addition of EA[15:0] and SRC2[15:0]. The determination of whether a carry out bit exists is fed to MUX 214 to control such MUX 214. That is, if a carry out bit is generated, a 1 is fed to control MUX 214, and if a carry out bit is not generated a 0 is fed to control MUX 214. In a most preferred embodiment, LAGEN circuitry 200 is arranged such that the carry generator 220 and dynamic circuitry 222 execute substantially in parallel with adder 206 (and adder 210) to determine in a timely manner whether a carry out bit exists. Thus, in a most preferred embodiment, carry generator 220 and dynamic circuitry 222 determine whether a carry out bit exists in a manner such that it is capable of controlling MUX 214 to provide the higher 16 bits of the generated linear address LA[31:16], if necessary, in a timely manner. For instance, in a most preferred embodiment, carry generator 220 and dynamic circuitry 222 determine whether a carry out bit exists to control MUX 214 at the time adder 206 produces res[31:0].

Turning to FIG. 2B, a functionally equivalent representation of circuitry 290 of FIG. 2A is provided. As shown in FIG. 2B, IMM[15:0] and SRC1[15:0] are latched in latches 274 and 272, respectively, and then they are added by a 16-bit adder 276 to generate EA[15:0]. SRC2[15:0] is latched in latch 270 and then input along with EA[15:0] to the 16-bit carry generate 278. The 1-bit output of the 16-bit carry generate 278 determines the carry out bit from bit 15 to bit 16 of operand SRC2 when EA[15:0] and SRC2[15:0] are added together. It should be recognized that the implementation of circuitry 290 in FIG. 2A is the functional equivalent to that of FIG. 2B but does not require the 16-bit adder of the implementation of FIG. 2B.

Figure 3:
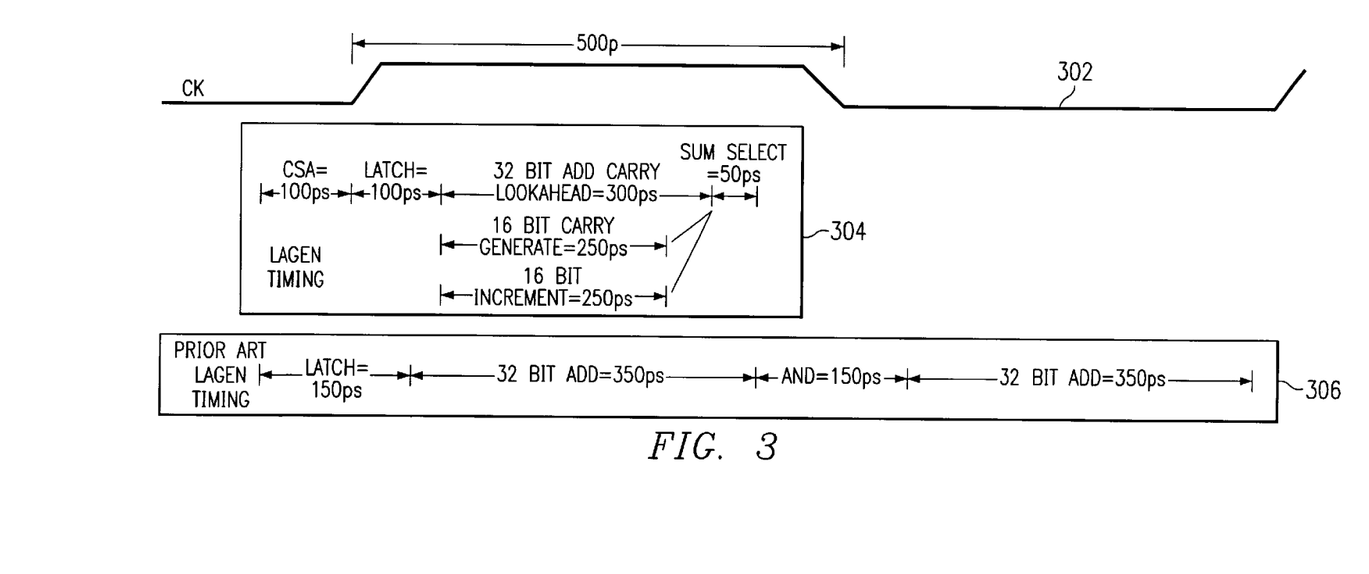
FIG. 3 shows exemplary timing diagram for generating a linear address that allows comparison between a preferred embodiment and a prior art LAGEN implementation.

FIG. 3 shows an exemplary timing diagram for the LAGEN circuitry operating with a clock 302 having a 1 GHz cycle of time, which means that each clock cycle is 1 nanosecond. Thus, for a LAGEN circuitry to generate a linear address within a single clock cycle, it must do so within 1 nanosecond. Additionally, because there is typically some bypass network used to bypass the linear address to control circuitry for cache access, it is desirable to have the LAGEN complete substantially faster than 1 nanosecond in order to complete within 1 clock cycle (of a 1 GHz clock). As shown in FIG. 3 and discussed in greater detail below, in a most preferred embodiment a linear address may be generated within 500 picoseconds (e.g., in 450 picoseconds shown in FIG. 3) from the time of latching the operands (the sum S[31:0] and carry C[31:0] generated from the CSA array 202). That is, in the timing diagram 304 of a preferred embodiment, from the start of the execution of the latch (i.e., latch 204 of FIG. 2A) to the completion of selecting the appropriate linear address output (i.e., generation of the linear address by block 212 of FIG. 2A) is within 500 picoseconds (e.g., 450 picoseconds). Typical prior art LAGENs require approximately one nanosecond to generate a linear address. As shown in FIG. 1, latching requires approximately 150 picoseconds, the first addition requires approximately 350 picoseconds, the AND gate operation requires approximately 150 picoseconds, and the second addition requires approximately 350 picoseconds, for a total of approximately one nanosecond.

FIG. 3 provides exemplary timing diagrams illustrated in reference to a clock signal 302. Shown in FIG. 3 is a typical timing diagram 306 for a prior art LAGEN (e.g., as shown and described with reference to FIG. 1). As shown in FIG. 3, latching the IMM[31:0], SRC1[31:0], and SRC2[31:0] operands (e.g., in latches 10, 12, and 14 of FIG. 1) consumes approximately 150 picoseconds. Thereafter, the execution of a first adder to sum the IMM[31:0] and SRC1[31:0] operands (e.g., adder 16 of FIG. 1) consumes an additional 350 picoseconds (approximately). Thereafter, the execution of an AND gate (e.g., AND gate 18 of FIG. 1) consumes approximately 150 picoseconds of additional time. Finally, the execution of a second adder to generate the linear address (e.g., adder 20 of FIG. 1) consumes an additional 350 picoseconds (approximately). Accordingly, a typical prior art LAGEN implementation that utilizes two adders in series requires approximately 1000 picoseconds (i.e., 1 nanosecond) from latching the operands to generating a linear address. Thus, prior art LAGEN circuitry typically requires at least 1 nanosecond to generate a linear address.

By comparison, a preferred embodiment generates a linear address in a substantially shorter period of time. As shown in the exemplary timing diagram 304 for a preferred embodiment, CSA array 202 compresses the three operands into two operands (a sum S[31:0] and carry C[31:0]), which consumes approximately 100 picoseconds. The two operands (sum S[31:0] and carry C[31:0]) are then latched in latch 204, which consumes approximately 100 picoseconds. As shown in FIG. 2A, in a preferred embodiment SRC2 [31:16] is latched in latch 208 in parallel with the latching of the sum S[31:0] and carry C[31:0] in latch 204, thus consuming no additional time in the timing diagram 304. As also shown in FIG. 2A, in a preferred embodiment operands IMM[15:0] and SRC1[15:0] are latched in latch 218 in parallel with the latching of the sum S[31:0] and carry C[31:0] in latch 204, thus consuming no additional time in the timing diagram 304. Next, adder 206 executes to add the sum S[31:0] and carry C[31:0] operands, which consumes approximately 350 picoseconds. In a preferred embodiment, carry generator 220 and dynamic circuitry 222 execute in parallel with adder 206 to determine whether a carry out bit is generated from the addition of the EA[15:0] and SRC2 [15:0] operands (see FIG. 2B). In a preferred embodiment, the execution of carry generator 220 and dynamic circuitry 222 requires approximately 250 picoseconds, but because it executes in parallel with adder 206 no additional time is consumed in the timing diagram 304. Also, in a preferred embodiment, incrementer 210 executes in parallel with adder 206 to increment operand SRC2[31:16] by 1. In a preferred embodiment, the execution of incrementer 210 requires approximately 250 picoseconds, but because it executes in parallel with adder 206, no additional time is consumed in the timing diagram 304.

Thereafter, block 212 of FIG. 2 operates to select the appropriate higher 16 bits of the generated linear address (according to whether 32-bit mode operation is enabled and whether a carry out bit is generated from the addition of EA[15:0] and SRC2[15:0]), which is combined with the lower 16 bits generated by the adder 206 (i.e., res[15:0]) to generate the appropriate linear address. In a preferred embodiment, operation of block 212 to generate the appropriate linear address consumes approximately 50 picoseconds. Thus, in a preferred embodiment, the LAGEN generates a linear address in substantially less than 1 nanosecond of time. For instance, in a preferred embodiment, the LAGEN generates a linear address within 500 picoseconds (i.e., 450 picoseconds in the exemplary timing diagram 304 of FIG. 3) of the two operands (sum S[31:0] and carry C[31:0]) being fed to latch 204. Accordingly, in a preferred embodiment, the LAGEN is capable of generating a linear address within a single clock cycle for a high-speed clock operating at 1 GHz. It should be recognized that even when considering the time consumed by CSA array 202 of a preferred embodiment, a preferred embodiment generates a linear address substantially faster than a LAGEN of the prior art. For example, when considering the time consumed by CSA array 202 of a preferred embodiment, which is approximately 100 picoseconds, the LAGEN circuitry generates a linear address within 600 picoseconds (i.e., 550 picoseconds in the exemplary timing diagram 304 of FIG. 3), as opposed to the approximately 1 nanosecond typically required for prior art LAGEN circuitry. Thus, a preferred embodiment utilizes a parallel design to achieve a high-speed LAGEN that generates linear addresses faster than the LAGENs of the prior art, which utilize two adders in series to generate a linear address.

It will be recognized that such a high-speed LAGEN of a preferred embodiment, is advantageous in that it allows for faster access to cache, thus allowing faster overall operation of a processor. Additionally, a high-speed LAGEN of a most preferred embodiment generates a linear address within a single cycle of a 1 GHz clock, thus allowing for simple cache design and fast access to cache for high-speed processors that operate at 1 GHz. A single-cycle LAGEN of a preferred embodiment also enables an in-order IVE implementation that results in a processor design that is much simpler, has higher performance, and has much faster time for project completion (e.g., because the time required for operational correctness verification and electrical verification is reduced) to allow the resulting processor to reach market in a more timely fashion.

As discussed above, in a most preferred embodiment, the LAGEN circuitry is implemented with a high-speed clock operating at 1 GHz, and the LAGEN circuitry is implemented to generate a linear address within a single clock cycle of such high-speed clock. However, in alternative embodiments, the LAGEN circuitry may be implemented for even higher speed clocks, wherein the LAGEN may not be capable of generating a linear address in a single clock cycle, and any such embodiment is intended to be within the scope of the present invention.

Figure 4:
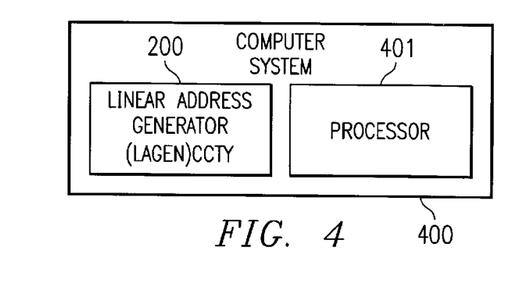
FIG. 4 shows a computer system that includes the embodiment of FIG. 2.

It should be understood that a LAGEN of the present invention may be implemented within any type of computer system having a processor, including but not limited to a personal computer (PC), laptop computer, and personal data assistant (e.g., a palmtop PC). For example, FIG. 4 depicts computer system 400 with processor 401 and LAGEN circuitry 200.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of generating a linear address comprising the steps of:

controlling whether a first bit mode operation or a second bit mode operation is enabled, wherein the first bit mode operation is a higher bit operation than the second bit mode operation;

receiving N operands into a linear address generator;

compressing said N operands to N-1 operands;

summing said N-1 operands to produce a result;

outputting said result as the linear address, if first bit mode operation is enabled, then said result is outputted; and outputting a lower bit portion of said result as the linear address, if the second bit mode operation is enabled.

2. The method of claim 1, wherein said N operands comprises three operands, SRC1, SRC2, and IMM, the method further comprising the steps of:

summing said SRC1 and said IMM operands to generate a EA operand; and determining if a carry out is generated when a lower bit portion of said SRC2 and a lower bit portion of said EA are added, wherein said determining is performed in parallel with said summing of said two operands.

3. The method of claim 2 further comprising the step of:

incrementing a higher bit portion of said SRC2 by 1, wherein said incrementing is performed in parallel with said summing.

4. The method of claim 3, wherein the first bit mode operation is a 32-bit mode operation and the second bit mode operation is a 16-bit mode operation, and the lower bit portion of said result is the lower 16 bits of said result.

5. The method of claim 4 further comprising the steps of:

if determined that 16-bit mode operation is enabled for said linear address generator and if determined that a carry out is generated when the lower 16 bits of said SRC2 and the lower 16 bits of said EA are added, then said linear address generator outputting the higher 16 bits of said SRC2 incremented by 1 for the higher 16 bits of said linear address; and if determined that 16-bit mode operation is enabled for said linear address generator and if determined that a carry out is not generated when the lower 16 bits of said SRC2 and the lower 16 bits of said IMM are added, then said linear address generator outputting the higher 16 bits of said SRC2 for the higher 16 bits of said linear address.

6. The method of claim 1 wherein said linear address generator outputs a linear address in less than 1 nanosecond of receiving the three operands.

7. The method of claim 6 wherein said linear address generator outputs a linear address in 500 picoseconds or less of receiving the three operands.

8. The method of claim 6 wherein said linear address generator outputs a linear address within 1 clock cycle of a clock when said clock is operating at 1 gigahertz.

9. A computer system comprising:

a processor; and a linear address generator having a parallel design, wherein said linear address generator is configured to receive operands and generate a linear address in 500 picoseconds or less of said operands being received by said linear address generator;

wherein said linear address generator is configured to receive three 32-bit operands SRC1, SRC2, and IMM, compress said three operands into two 32-bit operands and sum said two operands to produce a 32-bit result; said linear address generator is further configured to generate a EA operand by summing the IMM and SRC1 operands; and said linear address generator is further configured to determine, in parallel with said summing of said two operands, whether a carry out is generated when the lower 16 bits of said SRC2 and the lower 16 bits of said EA are added.

10. The computer system of claim 9 wherein said linear address is generated by said linear address generator in a time frame after said operands are received by said linear address generator such that said linear address is generated by said linear address generator in a single clock cycle of a clock operating at 1 gigahertz.

11. The computer system of claim 9 wherein said linear address generator comprises:

a Carry-Save-Adder array that receives three 32-bit operands, IMM, SRC1, and SRC2, and compresses said three operands to two 32-bit operands;

an adder to sum said two 32-bit operands to obtain a 32-bit result, wherein the lower 16 bits of said result are output as the lower 16 bits of said linear address; and a a first multiplexor to select an output for the higher 16 bits of said linear address depending on the mode of operation enabled for said linear address generator.

12. The computer system of claim 11 wherein said first multiplexor outputs the higher 16 bits of said result as said higher 16 bits of said linear address if 32-bit mode operation is enabled for said linear address generator.

13. The computer system of claim 12 further comprising:

a second multiplexor having its output input to said first multiplexor, wherein said first multiplexor selects for output, the output of said second multiplexor when 16-bit mode operation is enabled for said linear address generator;

said second multiplexor configured to output the higher 16 bits of said SRC2 operand if a carry out is not generated when the lower 16 bits of said SRC2 and the lower 16 bits of a EA operand are added, wherein said EA operand is generated by summing said IMM and said SRC1 operands; and said second multiplexor configured to output the higher 16 bits of said SRC2 operand incremented by 1 if a carry out is generated when the lower 16 bits of said SRC2 and the lower 16 bits of said EA are added.

14. A high-speed linear address generator (LAGEN) comprising:

means for receiving three 32-bit operands SRC1, SRC2, and IMM and for compressing said three operands to two 32-bit operands;

means for summing said two operands to produce a result, wherein the lower 16 bits of said result are output for the lower 16 bits of said linear address;

means, operable in parallel with said means for summing, for determining if a carry out is generated when the lower 16 bits of said SRC2 and the lower 16 bits of a EA operand are added, wherein said EA operand is the sum of said IMM and said SRC1 operands;

means for controlling whether 16-bit mode operation or 32-bit mode operation is enabled for said LAGEN; and a means for selecting the higher 16 bits to be output for said higher 16 bits of said linear address.

15. The high-speed LAGEN of claim 14 further comprising:

means, operable in parallel with said means for summing, for incrementing the higher 16 bits of said SRC2 by 1, and inputting said higher 16 bits of said SRC2 incremented by 1 into said means for selecting the higher 16 bits to be output for said higher 16 bits of said linear address.

16. The high-speed LAGEN of claim 14 therein said linear address is output by said LAGEN within approximately 500 picoseconds of said three operands being received by said means for receiving.

17. The high-speed LAGEN of claim 14 wherein said means for selecting selects the higher 16 bits of said result as the higher 16 bits for said linear address to be output by said LAGEN if determined that 32-bit mode operation is enabled for said LAGEN.

18. The high-speed LAGEN of claim 17 wherein said means for selecting selects the higher 16 bits of said SRC2 as the higher 16 bits for said linear address to be output by said LAGEN if determined that 16-bit mode operation is enabled for said LAGEN and if determined that a carry out is not generated when the lower 16 bits of said SRC2 and the lower 16 bits of EA are added.

19. The high-speed LAGEN of claim 18 wherein said means for selecting selects the higher 16 bits of said SRC2 incremented by 1 as the higher 16 bits for said linear address to be output by said LAGEN if determined that 16-bit mode operation is enabled for said LAGEN and if determined that a carry out is generated when the lower 16 bits of said SRC2 and the lower 16 bits of EA are added.

* * * * *

UNITED STATES PATENT AND TRADEMARK OFFICE
CERTIFICATE OF CORRECTION

PATENT NO. : 6,405,298 B1 Page 1 of 1
DATED : June 11, 2002
INVENTOR(S) : Richard B. Zeng It is certified that error appears in the above-identified patent and that said Letters Patent is hereby corrected as shown below:

<u>Column 12,</u>
Line 8, delete "therein" and insert therefor -- wherein --

Signed and Sealed this

Third Day of August, 2004

JON W. DUDAS
*Acting Director of the United States Patent and Trademark Office*